US007301893B2

(12) United States Patent
Onggosanusi et al.

(10) Patent No.: US 7,301,893 B2
(45) Date of Patent: Nov. 27, 2007

(54) LINEAR SPACE-TIME BLOCK CODE WITH BLOCK STTD STRUCTURE

(75) Inventors: Eko N. Onggosanusi, Dallas, TX (US); Anand G. Dabak, Plano, TX (US)

(73) Assignee: Texas Instruments Incorporated, Dallas, TX (US)

( * ) Notice: Subject to any disclaimer, the term of this patent is extended or adjusted under 35 U.S.C. 154(b) by 1000 days.

(21) Appl. No.: 10/301,364

(22) Filed: Nov. 21, 2002

(65) Prior Publication Data

US 2003/0147343 A1  Aug. 7, 2003

Related U.S. Application Data

(60) Provisional application No. 60/331,721, filed on Nov. 21, 2001.

(51) Int. Cl.
  *H04Q 7/20* (2006.01)
  *H04B 7/10* (2006.01)
  *H04J 13/00* (2006.01)

(52) U.S. Cl. ............. 370/210; 370/319; 370/370; 455/447; 375/347

(58) Field of Classification Search ........ 370/369–372, 370/375–380, 203–211, 328–350
See application file for complete search history.

(56) References Cited

U.S. PATENT DOCUMENTS

| | | | | |
|---|---|---|---|---|
| 5,600,672 A | * | 2/1997 | Oshima et al. ............. 375/219 |
| 6,542,556 B1 | * | 4/2003 | Kuchi et al. ................ 375/299 |
| 6,665,308 B1 | * | 12/2003 | Rakib et al. ................ 370/441 |
| 6,751,187 B2 | * | 6/2004 | Walton et al. .............. 370/210 |
| 6,768,713 B1 | * | 7/2004 | Siala et al. ................. 370/203 |
| 6,834,043 B1 | * | 12/2004 | Vook et al. ................. 370/310 |
| 6,985,434 B2 | * | 1/2006 | Wu et al. .................... 370/208 |
| 7,016,649 B1 | * | 3/2006 | Narasimhan et al. ...... 455/63.1 |
| 2001/0001616 A1 | * | 5/2001 | Rakib et al. ................ 375/259 |
| 2001/0024474 A1 | * | 9/2001 | Rakib et al. ................ 375/259 |
| 2001/0033614 A1 | * | 10/2001 | Hudson ...................... 375/229 |
| 2001/0033622 A1 | * | 10/2001 | Jongren et al. ............. 375/267 |
| 2001/0046266 A1 | * | 11/2001 | Rakib et al. ................ 375/259 |
| 2002/0015423 A1 | * | 2/2002 | Rakib et al. ................ 370/485 |
| 2003/0043732 A1 | * | 3/2003 | Walton et al. .............. 370/208 |

OTHER PUBLICATIONS

Siavash M Alamouti, Simple Transmit Diversity Technique for Wireless Communications, IEEE, vol. 16, No. 8, pp. 1451-1458, Sep. 1998.*

Ari Hottinen and Olav Tirkkonen, A randomization technique for non-othogonal Space-Time Block Codes, IEEE, vol. 2, pp. 1479-1482, 2001.*

Karii Majonen and Markku J Heikkila, Higher Data Rates with Space-Time Block Codes and Puncturing in WCDMA Systems, IEEE, pp. A-36-A-40, 2001.*

* cited by examiner

*Primary Examiner*—Jay K. Patel
*Assistant Examiner*—Venkatesh Haliyur
(74) *Attorney, Agent, or Firm*—Ronald O. Neerings; Wade James Brady, III; Frederick J. Telecky, Jr.

(57) ABSTRACT

Space-time block code with structure of a block STTD. 2×2 blocks allow partial orthogonality for low-complexity detection and optimized diversity gain and coding gain.

17 Claims, 4 Drawing Sheets

LINEAR SPACE-TIME BLOCK CODE WITH BLOCK STTD STRUCTURE

CROSS-REFERENCE TO RELATED APPLICATIONS

This application claims priority from provisional patent application Ser. No. 60/331,721, filed Nov. 21, 2001. Copending patent applications Ser. No. 10/144,114, filed May 13, 2002 disclose related subject matter and have a common assignee with the present application.

BACKGROUND OF THE INVENTION

The present invention relates to wireless digital communications, and more particularly to space-time diversity transmission systems and methods.

Spread spectrum wireless communications utilize a radio frequency bandwidth greater than the minimum bandwidth required for the transmitted data rate, but many users may simultaneously occupy the bandwidth. Each of the users has a pseudo-random code for "spreading" information to encode it and for "despreading" (by correlation) received spread spectrum signals and recovery of information. Such multiple access typically appears under the name of code division multiple access (CDMA). The pseudo-random code may be an orthogonal (Walsh) code, a pseudo-noise (PN) code, a Gold code, or combinations (modulo-2 additions) of such codes. After despreading the received signal at the correct time instant, the user recovers the corresponding information while other users' interfering signals appear noise-like. For example, the interim standard IS-95 for such CDMA communications employs channels of 1.25 MHz bandwidth and a pseudo-random code pulse (chip) interval $T_C$ of 0.8138 microsecond with a transmitted symbol (bit) lasting 64 chips. The recent 3GPP wideband CDMA (WCDMA) proposal employs a 3.84 MHz bandwidth and the CDMA code length applied to each information symbol may vary from 4 chips to 256 chips. Indeed, UMTS (universal mobile telecommunications system) approach UTRA (UMTS terrestrial radio access) provides a spread spectrum cellular air interface with both FDD (frequency division duplex) and TDD (time division duplex) modes of operation. UTRA currently employs 10 ms duration frames partitioned into 15 time slots with each time slot consisting of 2560 chips ($T_C$=0.26 microsecond).

The air interface leads to multipath reception, so a RAKE receiver has individual demodulators (fingers) tracking separate paths and combines the finger results to improve signal-to-noise ratio (SNR). The combining may use a method such as the maximal ratio combining (MRC) in which the individual detected signals in the fingers are synchronized and weighted according to their signal strengths or SNRs and summed to provide the decoding. That is, a RAKE receiver typically has a number of DLL or TDL code tracking loops together with control circuitry for assigning tracking units to the strongest received paths. Also, an antenna array could be used for directionality by phasing the combined signals from the antennas.

Further, UTRA allows for space-time block-coding-based transmit antenna diversity (STTD) in which, generically, channel bits $b_0$, $b_1$, $b_2$, $b_3$ (values ±1) are transmitted as the sequence $b_0$, $b_1$, $b_2$, $b_3$ by antenna 1 and simultaneously transmitted as the sequence $-b_2$, $b_3$, $b_0$, $-b_1$ by antenna 2. Note that interpreting ($b_0$, $b_1$) and ($b_2$, $b_3$) as two complex numbers (e.g., QPSK or QAM symbols) implies the sequence transmitted by antenna 2 differs from the sequence from antenna 1 by a rotation of $\pi/2$ in a two-complex-dimensional space followed by complex conjugation. See Alamouti, A Simple Transmit Diversity Technique for Wireless Communications, IEEE J. Selec. Areas on Comm. 1451 (1998).

STTD is a diversity technique in the sense that it provides redundancy for the transmitted symbols. In particular, (1) it provides full transmit diversity gain without bandwidth expansion, (2) there is no loss in code rate, and (3) it is an orthogonal code and thus allow simple maximum likelihood detection by a maximum ratio combiner followed by a demodulator. When used with a modulation scheme of order M (e.g., QPSK has M=4 and 16QAM has M=16) the complexity of the detector is proportional to 2M.

Recently, attempts to generalize orthogonal codes with full diversity and are noted in Naguib et al, Increasing Data Rate over Wireless Channels, IEEE Signal Proc. Mag. 76 (May 2000). However, it was proven that orthogonal space-time block codes with full diversity for more than 2 antennas (with complex symbols) suffer from rate loss. That is, for more than 2 transmit antennas, space-time block codes with all three of the foregoing properties do not exist. Thus there are various possibilities of partial fulfillment of the three properties.

More specifically, space-time block codes with symbol constellation rotation appear in Xin et al, Space-Time Diversity Systems Based on Unitary Constellation-Rotating Precoders, Proc. ICASSP 2429 (2001). The space-time rotation codes can achieve full diversity gain and good "coding gain", which can be measured in terms of distance from the full transmit diversity curves. However, this class of codes do not inherit any orthogonal structure and the complexity of the maximum likelihood detector for space-time rotation code is proportional to $M^P$ where P is the number of antennas and M the symbol constellation size. Sub-optimal detectors such as linear or iterative minimum mean square error can also be used to reduce the complexity to be proportional to $MP^3$.

Papadias et al, A Space-Time Coding Approach for Systems Employing Four Transmit Antennas, Proc. ICASSP 2481 (2001) and Tirkkonen et al, Minimal Non-Orthogonality Rate 1 Space-Time Block Code for 3+ Tx Antennas, IEEE 6th Int. Symp. on Spread-Spectrum Tech. & Appl. 429 (2000) show for systems with 4 antennas that instead of achieving full orthogonality, one can achieve three-level orthogonality which leads to maximum likelihood detector with complexity proportional to $(P/2)M^{P/2}$, and for the suboptimal detectors complexity reduces to 16M.

However, these block codes have limited performance.

SUMMARY OF THE INVENTION

The present invention provides space-time block codes with a block STTD code matrix structure plus transmission and/or reception with such codes. Preferred embodiments with 2×2 blocks (i.e., four antennas and blocks of four symbols) allow simple partial orthogonality for low complexity detection plus provide large diversity gain and coding gain.

This has the advantages including increased performance (in terms of error rate and system throughput) for wireless communications.

BRIEF DESCRIPTION OF THE DRAWINGS

The drawings are heuristic for clarity.

DESCRIPTION OF THE PREFERRED EMBODIMENTS

1. Overview

Figures 1, 3:
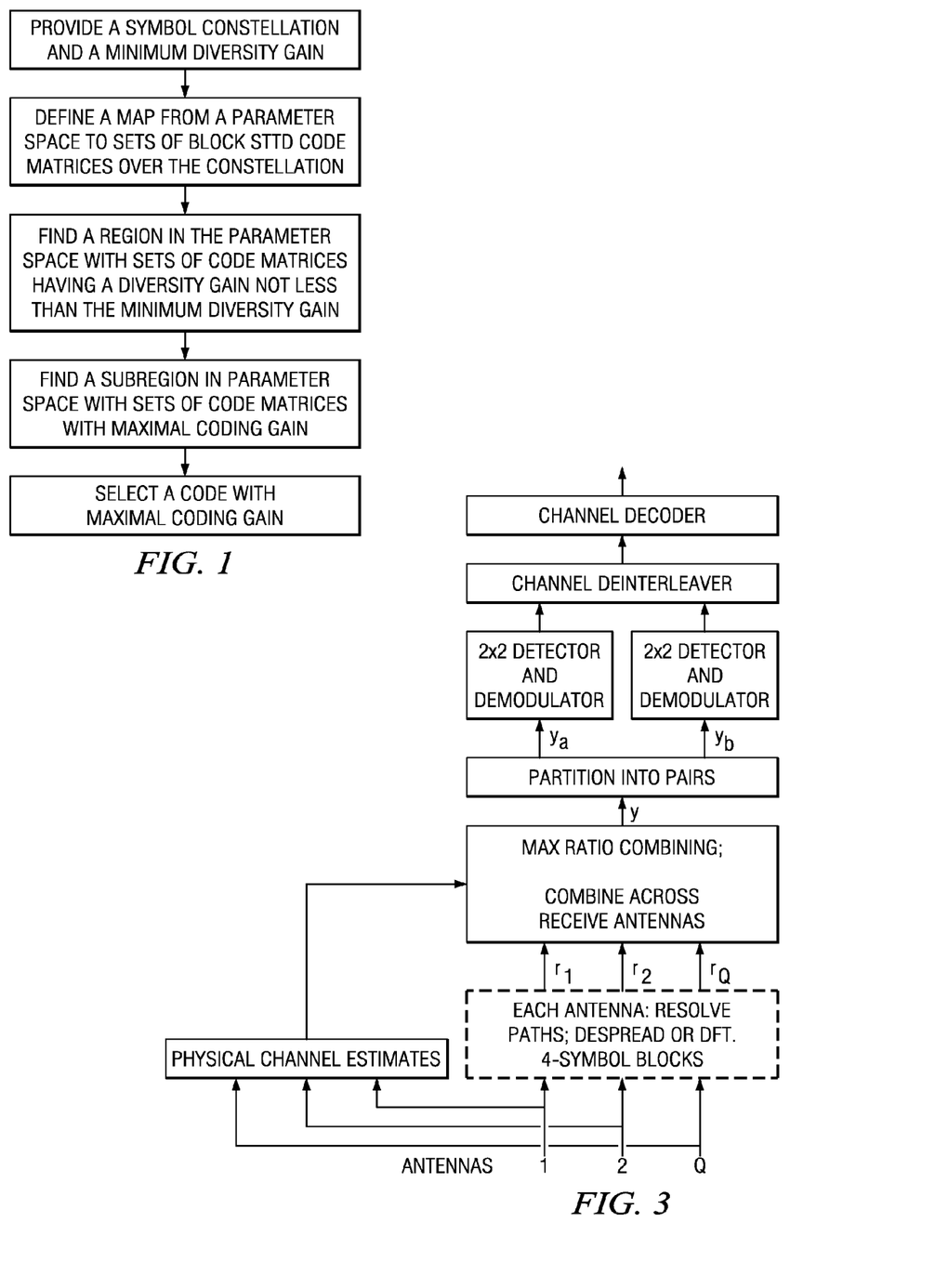
FIG. 1 is a flow diagram.
FIG. 3 shows preferred embodiment receiver.

FIG. 1 is a flow diagram for preferred embodiment code design methods which can be used for preferred embodiment space-time block encoding with a block STTD structure. This structure allows for partial orthogonality and consequent low-complexity detection. Preferred embodiments include 2×2 blocks which apply to four transmission antennas with four-symbol code blocks. The preferred embodiment 2×2 block STTD code matrices possess a channel-code 3-level orthogonality plus jointly maximized diversity gain and coding gain.

Figure 2A:
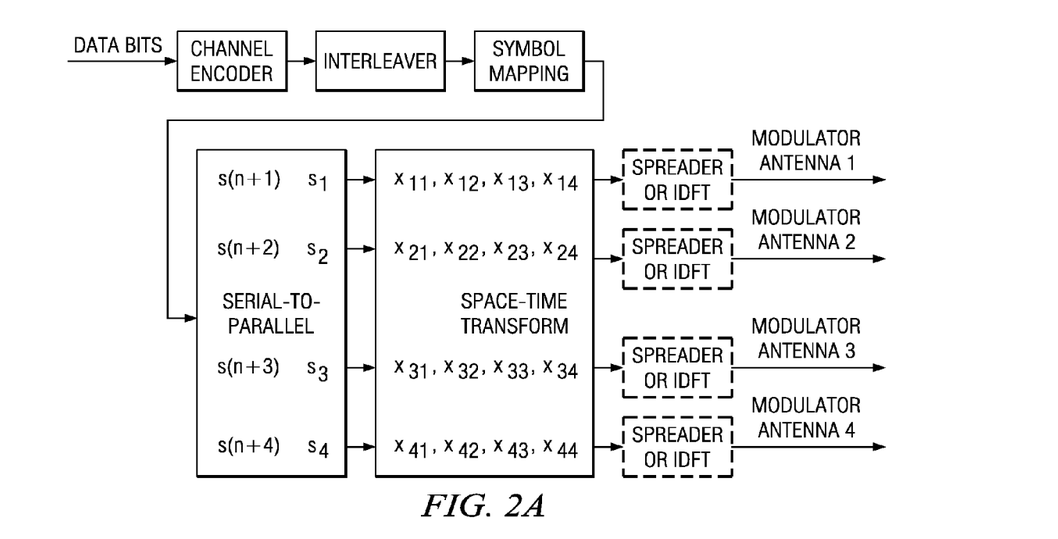
FIGS. 2*a*-2*b* illustrate preferred embodiment transmitter.
Figure 2B:
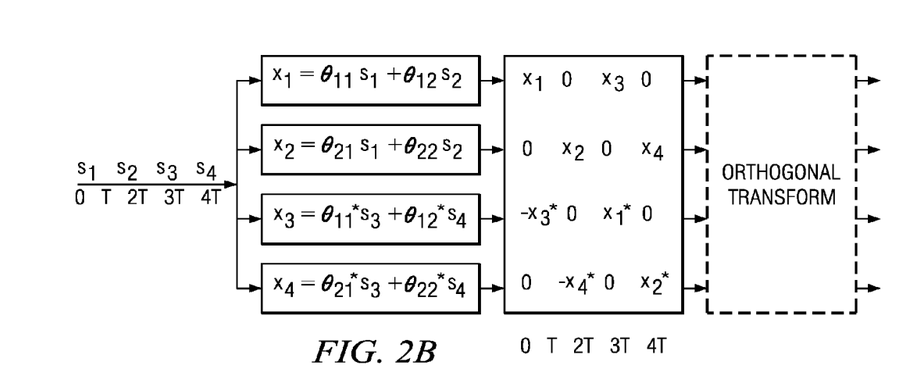

Preferred embodiment communications systems use preferred embodiment encoding and decoding methods, FIGS. 2*a*-2*b* illustrate preferred embodiment transmitter and receiver functional blocks.

In preferred embodiment communications systems base stations and mobile users could each include one or more digital signal processors (DSPs) and/or other programmable devices with stored programs for performance of the signal processing of the preferred embodiment methods. Alternatively, specialized circuitry could be used. The base stations and mobile users may also contain analog integrated circuits for amplification of inputs to or outputs from antennas and conversion between analog and digital; and these analog and processor circuits may be integrated as a system on a chip (SoC). The stored programs may, for example, be in ROM or flash EEPROM integrated with the processor or external. The antennas at the receiver may be parts of receivers with multiple finger RAKE detectors for each user's signals. Exemplary DSP cores could be in the TMS320C6xxx or TMS320C5xxx families from Texas Instruments.

2. Four-Antenna, Four-Symbol, 3-Level Orthogonality

First preferred embodiment space-time transmit diversity block codes use blocks of four symbols and transmit with four antennas, have 3-level orthogonality (described below) of column vectors of the channel-code matrix for low complexity detection, plus jointly maximized diversity gain and coding gain as described below.

FIGS. 2*a*-2*b* illustrate functional blocks of a first preferred embodiment transmitter which could be a base station transmitter in a cellular wireless system. FIG. 3 illustrates a preferred embodiment receiver with Q antennas for reception, such as for a mobile user in a cellular wireless system. A base station may include the channel estimation and block coding transformation computation as in FIG. 2*b*.

In general a block code for blocks of N symbols and for P antennas can be represented by P×N code matrices C. For example, the 2×2 STTD described in the background codes a block of two complex symbols ($s_1$, $s_2$) for transmission modulation as $s_1$, $s_2$ on a first antenna and $-s_2^*$, $s_1^*$ on a second antenna. This 2×2 STTD thus has code matrices $$C(s) = \begin{bmatrix} s_1 & s_2 \\ -s_2^* & s_1^* \end{bmatrix}$$

where s denotes the block of symbols $s_1$, $s_2$. The two elements of the first row of C are the two transmission modulations for the first antenna during the two symbol periods, and the elements of the second row are the two transmission modulations for the second antenna during the same two symbol periods. Thus over two symbol periods and using two antennas, the 2×2 STTD transmits two symbols. That is, this 2×2 STTD has a block code rate of ½ where the block code rate is defined as the ratio of the number of symbols transmitted in a block divided by the product of the number of transmit antennas and the number of symbol periods in the block:

For systems with P transmit antennas, a space-time block code with full transmit diversity can have a block code rate of at most 1/P. The preferred embodiment space-time block codes use four antennas (P=4), blocks of four symbols (N=4), and have a block code rate of ¼. In particular, with a block s of symbols $s_1$, $s_2$, $s_3$, $s_4$, the first preferred embodiment space-time block codes have 4×4 code matrices of the form:

$$C(s) = \begin{bmatrix} C_\alpha & C_\beta \\ -C_\beta^* & C_\alpha^* \end{bmatrix}$$

with 2×2 submatrices:

$$C_\alpha = s_1 A_1 + s_2 A_2 + s_1^* B_1 + s_2^* B_2$$

$$C_\beta = s_3 A_3 + s_4 A_4 + s_3^* B_3 + s_4^* B_4$$

where each of $A_k$ and $B_k$ is a 2×2 complex matrix. (The space-time code is defined by the set of $A_k$s and $B_k$s.) During the first and second symbol periods antennas 1 and 2 transmit the $C_\alpha$ combinations of $s_1$ and $s_2$ while antennas 3 and 4 transmit the $-C_\beta^*$ combinations of $s_3$ and $s_4$. Then during the third and fourth symbol periods antennas 1 and 2 transmit the $C_\beta$ combinations of $s_3$ and $s_4$ while antennas 3 and 4 transmit the $C_\alpha^*$ combinations of $s_1$ and $s_2$. Thus preferred embodiment space-time block codes have the form of a higher dimensional analog of the 2×2 STTD; that is, they are block STTD. Indeed, for the special case of $$A_1 = A_3 = \begin{bmatrix} 1 & 0 \\ 0 & 0 \end{bmatrix}, A_2 = A_4 = \begin{bmatrix} 0 & 0 \\ 0 & 1 \end{bmatrix}, \text{ and}$$

$$B_1 = B_2 = B_3 = B_4 = \begin{bmatrix} 0 & 0 \\ 0 & 0 \end{bmatrix}$$

the space-time block code is essentially an interleaved version of two 2×2 STTD codes: during the first and third symbol periods the first and third symbols would be transmitted on the first and third antennas, and during the second and fourth symbol periods the second and fourth symbols would be transmitted on the second and fourth antennas.

Other possible variations of the block STTD structure that achieve the same purpose can also be used. For example:

$$C(s) = \begin{bmatrix} C_\alpha & -C_\beta^* \\ C_\beta & C_\alpha^* \end{bmatrix} \text{ or } \begin{bmatrix} C_\alpha & -C_\beta \\ C_\beta^* & C_\alpha^* \end{bmatrix} \text{ or } \begin{bmatrix} C_\alpha & C_\beta \\ C_\beta^* & -C_\alpha^* \end{bmatrix}$$

and similar variations.

Initially, consider the cases with $$B_1 = B_2 = B_3 = B_4 = \begin{bmatrix} 0 & 0 \\ 0 & 0 \end{bmatrix}.$$

To describe the 3-level orthogonality and consequent low-complexity detection, first consider the received signal for the case of one receiver antenna. Denote the received signal during the four symbol periods as $r_1$, $r_2$, $r_3$, $r_4$; then with the four channels (one from each transmit antenna to the single receive antenna) defined by impulse responses $h_1$, $h_2$, $h_3$, $h_4$, the received signal in vector notation is (ignoring noise and presuming maximal ratio combining of multipath signals):

$$[r_1, r_2, r_3, r_4] = [h_1, h_2, h_3, h_4]C(s)$$

Thus the column index of C corresponds to time and the row index to space (antenna number). In the α-β notation of C as an analog of 2×2 STTD, this can be rewritten as $$r_\alpha^T = h_\alpha^T C_\alpha + h_\beta^T(-C_\beta^*) \text{ and } r_\beta^H = h_\alpha^H C_\beta^* + h_\beta^H C_\alpha$$

where $r_\alpha^T = [r_1, r_2]$, $r_\beta^T = [r_3, r_4]$, $h_\alpha^T = [h_1, h_2]$, $h_\beta^T = [h_3, h_4]$.

And in terms of a 4-vector r of received signals $r_1$, $r_2$, $r_3^*$, $r_4^*$ depending on a 4-vector s of transmitted symbols $s_1$, $s_2$, $s_3^*$, $s_4^*$ through a channel-code matrix H, this translates to r=Hs, which written in terms of elements is:

$$\begin{bmatrix} r_1 \\ r_2 \\ r_3^* \\ r_4^* \end{bmatrix} = \begin{bmatrix} h_\alpha^T a_{11} & h_\alpha^T a_{21} & -h_\beta^T a_{31}^* & -h_\beta^T a_{41}^* \\ h_\alpha^T a_{12} & h_\alpha^T a_{22} & -h_\beta^T a_{32}^* & -h_\beta^T a_{42}^* \\ h_\beta^H a_{11} & h_\beta^H a_{21} & h_\alpha^H a_{31}^* & h_\alpha^H a_{41}^* \\ h_\beta^H a_{12} & h_\beta^H a_{22} & h_\alpha^H a_{32}^* & h_\alpha^H a_{42}^* \end{bmatrix} \begin{bmatrix} s_1 \\ s_2 \\ s_3^* \\ s_4^* \end{bmatrix}$$

where $A_m = [a_{m1}, a_{m2}]$ for m=1,2,3,4. That is, $a_{mj}$ is a 2-vector column of $A_m$.

The first preferred embodiment 4×4 space-time codes, in addition to having code matrices of the form C, has 3-level orthogonality in H in the sense that each column vector of H is orthogonal to 2 or all 3 of the other three column vectors. Note that the jth component of the kth column vector represents the antenna weightings multiplied by channel impulse responses of the kth symbol transmitted during the jth symbol period. Thus the 3-level orthogonality is an orthogonality between symbol combinations and relates to low-complexity detection as illustrated in section 6 below. In particular, the inner products of the various column vectors of H are the elements of the 4×4 matrix $H^H H$ used in maximum likelihood detection. That is, the (m,n)th element of $H^H H$ is the inner product of the mth and nth column vectors, and thus 3-level orthogonality can be expressed visually as requiring at least four of the six upper triangle (and by symmetry at least four of the six lower triangle) entries of $H^H H$ vanish. Of course, by re-labeling, the 3-level orthogonality could be taken as column 1 and column 2 each orthogonal to both column 3 and column 4, and conversely. In this case the 2×2 upper right and 2×2 lower left submatrices of $H^H H$ are both 0.

Due to the separation of symbols $s_1$, $s_2$ from symbols $s_3$, $s_4$ by the structure of C, the inner product of H column j with H column k (with j=3 or 4 and k=1 or 2) equals:

$-h_\beta^H a_{j1} h_\alpha^T a_{k1} - h_\beta^H a_{j2} h_\alpha^T a_{k2} + h_\beta^H a_{k1} h_\alpha^T a_{j1} + h_\beta^H a_{k2} h_\alpha^T a_{j2} = h_2 h_3^*(-a_{j1,1} a_{k1,2} - a_{j2,1} a_{k2,2} + a_{j1,2} a_{k1,1} + a_{j2,2} a_{k2,1})$ $+ h_1 h_4^*(-a_{j1,2} a_{k1,1} - a_{j2,2} a_{k2,1} + a_{j1,1} a_{k1,2} + a_{j2,1} a_{k2,2}) = \det[h_\alpha h_\beta^*](\det[a_{j1} a_{k1}] + \det[a_{j2} a_{k2}])$ where the components of the 2-vectors were used: $h_\beta^H = [h_3^*, h_4^*]$, $h_\alpha^T = [h_1, h_2]$, $a_{m1} = [a_{m1,1}, a_{m1,2}]^T$, and $a_{m2} = [a_{m2,1}, a_{m2,2}]^T$. Note the multipliers of $h_1 h_3^*$ and $h_2 h_4^*$ both vanish, which reflects the structure of C as a block STTD code matrix.

Conditions on the $A_m$ (i.e., the $a_{mn}$) which make the sum of determinants $\det[a_{j1} a_{k1}] + \det[a_{j2} a_{k2}]$ vanish for each of the four inner products will thus define codes with 3-level orthogonality, and conversely. This leads to space-time code design in the following sections. Of course, the simplest condition would be to have all four $a_{m1}$ be parallel and to have all four $a_{m2}$ be parallel to make all eight determinants $\det[a_{jn} a_{kn}]$ vanish. In fact, section 4 considers codes with all $a_{m1}$ as multiples of $$\begin{bmatrix} 1 \\ 0 \end{bmatrix}$$

and all $a_{m2}$ as multiples of $$\begin{bmatrix} 0 \\ 1 \end{bmatrix}$$

and imposes further constraints for practical code design methods.

Further, a 2×2 orthogonal transformation applied to all of the $A_m$ preserves the sum of determinants and thus preserves 3-level orthogonality. In particular, let $$U = \begin{bmatrix} u_{11} & u_{12} \\ u_{21} & u_{22} \end{bmatrix}$$

and consider the transformation $A_m \to A_m U$ for m=1,2,3,4; then $\det[a_{j1}, a_{k1}] \to \det[u_{11}a_{j1} + u_{21}a_{j2}, u_{11}a_{k1} + u_{21}a_{k2}]$ $\det[a_{j2}, a_{k2}] \to \det[u_{12}a_{j1} + u_{22}a_{j2}, u_{12}a_{k1} + u_{22}a_{k2}]$.

Using the multilinearity of the determinant yields:

$\det[a_{j1}, a_{k1}] + \det[a_{j2}, a_{k2}] \to (u_{11}^2 + u_{12}^2)\det[a_{j1}, a_{k1}]$ $+ (u_{21}^2 + u_{22}^2)\det[a_{j2}, a_{k2}]$ $+ (u_{11}u_{21} + u_{12}u_{22})\det[a_{j1}, a_{k2}]$ $+ (u_{11}u_{21} + u_{12}u_{22})\det[a_{j2}, a_{k1}]$ Thus U orthogonal preserves the sum of determinants, and more generally, U a multiple of an orthogonal matrix preserves 3-level orthogonality. Section 4 uses an orthogonal U to reduce the peak-to-average power ratio by transformation applied to C. Of course, an orthogonal U is just rotating the antenna weightings of a each symbol over time for a pair of antennas (1-2 or 3-4) and a pair of symbol periods (1-2 or 3-4).

In contrast, the inner product of H column j with H column k for j and k both 1 or 2 or both 3 or 4 do not have the channel coefficients, $h_1$, $h_2$, $h_3$, $h_4$, factoring out as in the previous inner products, so the code alone cannot achieve orthogonality. In particular, the inner product of column j with column k with j and k both 1 or 2 equals $(|h_1|^2+|h_3|^2)A_k A_j^H(1,1)+(h_1^* h_2+h_3 h_4^*)A_k A_j^H(2,1)$ $+(h_1 h_2^*+h_3^* h_4)A_k A_j^H(1,2)+(|h_2|^2+|h_4|^2)A_k A_j^H(2,2)$ $=\|h_1\|^2 A_k A_j^H(1,1)+<h_1|h_2> A_k A_j^H(2,1)$ $+<h_2|h_1> A_k A_j^H(1,2)+\|h_2\|^2 A_k A_j^H(2,2)$ $=\Sigma_{1 \leq m,n \leq 2} <h_m|h_n> A_k A_j^H(m,n)$ where $A_k A_j^H(m,n)$ is the row m, column n element of $A_k A_j^H$ and equals the inner product of the nth row of $A_j$ with the mth row of $A_k$, and $$h_1 = \begin{bmatrix} h_1 \\ h_3^* \end{bmatrix}, h_2 = \begin{bmatrix} h_2 \\ h_4^* \end{bmatrix}.$$

The inner product for j and k both 3 or 4 is the complex conjugate:

$=\Sigma_{1 \leq m,n \leq 2} <h_n|h_m> A_j A_k^H(m,n)$

Thus conditions on code defining matrices $A_m$ can make the inner products of H columns 1 and 2 appear similar to inner products of H columns 3 and 4 because the channel coefficient factors are the same.

FIG. 3 illustrates a receiver for transmissions using a block STTD space-time code possessing 3-level orthogonality. The 3-level orthogonality permits lower complexity detection as described in section 6 below.

Further, for sufficiently large signal-to-noise ratio (SNR), a space-time block code has performance determined by the diversity gain, $G_D$, and the coding gain, $G_C$, with the following definitions:

$G_D = \min_{s \neq s'} \text{rank}\{[C(s)-C(s')]^H [C(s)-C(s')]\}$ $G_C = \min_{s \neq s'} \det\{[C(s)-C(s')]^H [C(s)-C(s')]\}$ where the two code matrices have differing symbol blocks. Thus the preferred embodiment block STTD space-time codes also jointly maximize gains in addition to having 3-level orthogonality. This maximization requires consideration of all constellation symbols, and thus is more than just the 3-level orthogonality which only depends upon the $A_m$. These conditions on the block STTD space-time codes to have 3-level orthogonality provide limitations for searching to find optimal coding diversity and coding gain.

Note that the foregoing extends to systems with more than four antennas. Explicitly, for P antennas (P an even integer) and symbol blocks of size P, use the same block STTD structure for the P×P matrices C(s) where the (P/2)×(P/2) submatrices are:

$C_\alpha = s_1 A_1+s_2 A_2+\ldots+s_{P/2} A_{P/2}+s_1^* B_1+s_2^* B_2+\ldots$
$+s_{P/2}^* B_{P/2}$ $C_\beta s_{P/2+1} A_{P/2+1}+\ldots+s_P A_P+s_{P/2+1}^* B_{P/2+1}+\ldots$
$+s_P^* B_P$ where each of $A_k$ and $B_k$ is a (P/2)×(P/2) complex matrix. Again, a partial orthogonality of the columns of the P×P channel-code matrix H for the case of all $B_k$=0 can be expressed in terms of sums of 2×2 determinants but where the sums include all combinations of from the P/2-vectors which make up the columns of the corresponding $A_k$. Again, the section 4 case of all $A_k$ diagonal insures the partial orthogonality.

3. 5-Condition Preferred Embodiments

As noted in the preceding section, 3-level orthogonality leads to low-complexity detection, but to find space-time block codes which also maximize diversity gain and coding gain requires searching over classes of 3-level orthogonal codes combined with symbol constellations. Practicality demands some restriction and/or parameterization of the class of space-time blocks codes to be searched. Thus consider a class of codes possessing 3-level orthogonality in the form:

$$H^H H = \begin{bmatrix} R & 0 \\ 0 & R \end{bmatrix}$$

where 0 is the 2×2 matrix of 0s and $$R = \begin{bmatrix} \rho_{11} & \rho_{12} \\ \rho_{12}^* & \rho_{22} \end{bmatrix}.$$

Thus the column 1 and column 2 vectors of H are orthogonal to the column 3 and column 4 vectors, the inner product of the column 1 vector with the column 2 vector equals the inner product of the column 3 vector with the column 4 vector ($=\rho_{12}$), the squared magnitude of the column 1 vector equals the squared magnitude of the column 3 vector ($=\rho_{11}$), and the squared magnitude of the column 2 vector equals the squared magnitude of the column 4 vector ($=\rho_{22}$).

The foregoing form of $H^H H$ is equivalent leads to the following five conditions for the code defining matrices $A_k$:

1) there exist a pair of phases $\phi,\varphi$ so that either $[a_{11}\ a_{12}]=[e^{j\phi}\ a_{31}\ e^{j\varphi}\ a_{32}]$ or $[a_{11}\ a_{12}]=[e^{j\phi}\ a_{32}\ e^{j\varphi}\ a_{31}]$ 2) there exist a pair of phases $\phi,\ \varphi$ so that either $[a_{21}\ a_{22}]=[e^{j\phi}\ a_{41}\ e^{j\varphi}\ a_{42}]$ or $[a_{21}\ a_{22}]=[e^{j\phi}\ a_{42}\ e^{j\varphi}\ a_{41}]$ 3) $a_{11}a_{41}^T+a_{12}a_{42}^T=a_{41}a_{11}^T+a_{42}a_{12}^T$ (i.e., $A_1 A_4^T$ is symmetric)

4) $a_{21}a_{31}^T+a_{22}a_{32}^T=a_{31}a_{21}^T+a_{32}a_{22}^T$ (i.e., $A_2 A_3^T$ is symmetric)

5) $a_{11}a_{21}^H+a_{12}a_{22}^H=a_{41}a_{31}^H+a_{42}a_{32}^H$ (i.e., $A_1 A_2^H = A_4 A_3^H$)

These conditions provide further limitations on the block STTD structure and thereby simplify searching to generate codes with 3-level orthogonality plus maximal coding gain and diversity gain.

4. STTD-Based 3-Level Orthogonal Using Rotation Preferred Embodiments

Third preferred embodiment space-time block codes have 4×4 code matrices C(s) with diagonal code-defining matrices $A_k$:

$$A_1 = \begin{bmatrix} \theta_{11} & 0 \\ 0 & \theta_{21} \end{bmatrix}$$

-continued $$A_2 = \begin{bmatrix} \theta_{12} & 0 \\ 0 & \theta_{22} \end{bmatrix}$$

$$A_3 = A_1^*$$

$$A_4 = A_2^*$$

where the matrix $$\Theta = \begin{bmatrix} \theta_{11} & \theta_{12} \\ \theta_{21} & \theta_{22} \end{bmatrix}$$

is a unitary matrix, although it can be any arbitrary invertible matrix. ($\Theta$ invertible is equivalent to $A_1$ not a multiple of $A_2$.) The use of a unitary matrix to mix the pair of symbols $s_1, s_2$ and to mix the pair of symbols $s_3, s_4$ preserves energy and distance within the symbol constellation because unitary operations are isometric isomorphisms. Note that with $\Theta = I$ symbol $s_1$ is transmitted at time 1 on antenna 1 and symbol $s_2$ is transmitted at time 2 on antenna 2; whereas, with $\Theta$ differing from the identity, symbols $s_1$ and $s_2$ are mixed to be transmitted at time 1 on antenna 1 and at time 2 on antenna 2. $\Theta$ analogously mixes symbols $s_3$ and $s_4$ to be transmitted at time 3 on antenna 1 and at time 4 on antenna 2. Antennas 3 and 4 have the complex conjugates in reverse order and with a minus sign for $s_3$ and $s_4$.

The foregoing $A_k$ define the following $C_\alpha$ and $C_\beta$:

$$C_\alpha = \begin{bmatrix} \theta_{11}s_1 + \theta_{12}s_2 & 0 \\ 0 & \theta_{21}s_1 + \theta_{22}s_2 \end{bmatrix}$$

$$C_\beta = \begin{bmatrix} \theta_{11}*s_3 + \theta_{12}*s_4 & 0 \\ 0 & \theta_{21}*s_3 + \theta_{22}*s_4 \end{bmatrix}$$

and as noted in section 2, these codes have 3-level orthogonality. Further, $\Theta$ being unitary allows for a simple parameterization and optimization searching. Indeed, for $\Theta$ in SU(2) there are angle parameters $\phi$, $\varphi$, $\psi$ so that $$\Theta = \begin{bmatrix} e^{j\psi}\cos\varphi & e^{j\phi}\sin\varphi \\ -e^{-j\phi}\sin\varphi & e^{-j\psi}\cos\varphi \end{bmatrix}$$

Sufficient flexibility occurs with the angle parameters constrained to $\psi=0$, $0 \leq \varphi \leq \pi/2$, and $-\pi < \phi \leq \pi$. Also, including a reflection effectively just relabels the symbols. Hence, take $$\Theta(\varphi, \phi) = \begin{bmatrix} \cos\varphi & e^{j\phi}\sin\varphi \\ -e^{-j\phi}\sin\varphi & \cos\varphi \end{bmatrix}$$

That is, for each pair of parameter values $(\varphi, \phi)$ in the ranges (expressed in radians) $0 \leq \varphi \leq \pi/2$ and $-\pi < \phi \leq \pi$, the third preferred embodiment generates a block STTD space-time block code having the code matrix C(s) for the block of symbols $s=(s_1, s_2, s_3, s_4)$ as $$C(\varphi, \phi; s) = \begin{bmatrix} C_\alpha(\varphi, \phi; s) & C_\beta(\varphi, \phi; s) \\ -C_\beta(\varphi, \phi; s)^* & C_\alpha(\varphi \cdot \phi' s)^* \end{bmatrix}$$

where $$C_\alpha(\varphi, \phi; s) = \begin{bmatrix} (\cos\varphi)s_1 + (e^{j\phi}\sin\varphi)s_2 & 0 \\ 0 & (-e^{-j\phi}\sin\varphi)s_1 + (\cos\varphi)s_2 \end{bmatrix}$$

$$C_\beta(\varphi, \phi; s) = \begin{bmatrix} (\cos\varphi)s_3 + (e^{-j\phi}\sin\varphi)s_4 & 0 \\ 0 & (-e^{-j\phi}\sin\varphi)s_3 + (\cos\varphi)s_4 \end{bmatrix}$$

And the diversity gain, $G_D$, for this space-time block code then can be determined by computation over pairs of symbol blocks as $$G_D = \min_{s \neq s'} \text{rank}\{[C(\phi,\phi;s) - C(\phi,\phi;s')]^H [C(\phi, \phi;s) - C(\phi, \phi;s')]\}$$

and the coding gain, $G_C$, can be analogously determined as $$G_C = \min_{s \neq s'} \det\{[C(\phi,\phi;s) - C(\phi,\phi;s')]^H [C(\phi, \phi;s) - C(\phi, \phi;s')]\}$$

As illustrated in FIG. 1, the preferred embodiment block STTD space-time block code design proceeds as follows.

1) Given a symbol constellation and a minimum acceptable diversity gain $G_D$, determine a region in the parameter space $0 \leq \varphi \leq \pi/2$, and $-\pi < \phi \leq \pi$ in which each space-time block code with code matrices $C(\varphi,\phi;s)$ has a diversity gain at least as large as $G_D$. This may be done by searching over the parameter space by evaluations on a grid or with a variational method.

2) For the space-time block codes defined by the region from step 1), maximize with respect to coding gain, $G_C$. That is, find a subset (which may be a single point) of the region of step 1) which defines a space-time block code with maximum coding gain. Again, this may be done by searching over the parameter region by evaluations on a grid or with a variational method.

Alternatively, a minimum coding gain may be used, and other criteria imposed, such as the following preferred embodiment design method:

1) Given a symbol constellation and a minimum acceptable diversity gain $G_D$, determine a region in the parameter space $0 \leq \varphi \leq \pi/2$, and $-\pi < \phi \leq \pi$ in which each space-time block code with code matrices $C(\varphi,\phi;s)$ has a diversity gain at least as large as $G_D$.

2) For the space-time block codes defined by the region from step 1), maximize with respect to coding gain, $G_C$. Then find a subset of the region of step 1) which defines space-time block codes with coding gain at least as large as 90% (or some other threshold fraction) of this maximum coding gain.

3) For the space-time codes of step (2) with at least 90% of the maximum coding gain, minimize with respect to multiplicity.

Table 1 shows examples of such coding design for the QPSK constellation.

TABLE 1

| Type | φ (deg) | ϕ (deg) | $G_D$ | $G_C$ |
|---|---|---|---|---|
| Real rotation | 58.32° | 0° | 4 | 10.21 |
| Complex rotation | 45.54° | −128.52° | 4 | 16.00 |

Thus a preferred embodiment block STTD code for a QPSK constellation has the code matrices $A_m$ defined by the unitary Θ(φ,ϕ) with φ=0.795 and ϕ=−2.243.

Again, the foregoing extends to P×P for P an even integer greater than 4. In particular, with Θ a (P/2)×(P/2) unitary matrix, for k=1, 2, . . . , P/2 take $A_k$ to be a diagonal matrix with elements equal to the elements of the kth column of Θ and take $A_{k+P/2}=A_k^*$. Thus Θ provides a mixing of symbols $s_1, s_2, \ldots, s_{P/2}$ and a corresponding mixing of symbols $s_{P/2+1}^*, s_{P/2+2}^*, \ldots, s_P^*$.

5. Transmitter

FIG. 2a illustrates a transmitter with a 4×4 space-time encoder which could be a preferred embodiment encoder and which may operate as follows. Presume a block of data bits (with FEC) is channel encoded, block interleaved, mapped to symbols, and then partitioned into blocks of length 4 with the nth block denoted $s_1(n), s_2(n), s_3(n), s_4(n)$, where each symbol $s_j(n)$ is interpreted as a discrete complex number (e.g., an element of a constellation such as QPSK, QAM, . . . ). The serial-to-parallel converter sends the block of four symbols to the 4×4 space-time encoder which outputs symbol streams to the four modulators and antenna drivers. Systems such as TDMA, CDMA, OFDM, and so forth could be used. Additionally (shown in broken lines in FIG. 2a), for the case of a CDMA system each of the four outputs is spread (multiplied by a common spreading code), and for the case of a multitone system the inverse discrete Fourier transform is applied. Then the (spread) transformed-symbol streams drive modulators (pulse generators (at the chip rate) with essentially cosine and sine pulses for the real (in phase) and imaginary (quadrature) components which modulate the carrier wave radiated by the corresponding antennas. For preferred embodiments not using CDMA, omit the spreading and operate the pulse generators at the symbol rate. For an OFDM (orthogonal frequency division multiplexing) system each sub-carrier (tone) would carry a portion of the transmitted symbols.

FIG. 2b illustrates the space-time encoder for the STTD-based 3-level orthogonality with rotation preferred embodiment of section 4 in terms of the unitary matrix Θ. FIG. 2b uses "0 . . . T . . . 2T . . . 3T . . . 4T" to indicate the four time intervals of the input four symbols and of the output four streams to the modulators. Note that (without the optional orthogonal transformation) during the first and third transmission intervals the first and third antennas are active and the second and fourth antennas are not, and conversely for the second and fourth transmission intervals.

Additionally, FIG. 2b shows an optional orthogonal transformation of the output space-time blocks with broken lines. This orthogonal transformation can solve a potential problem of large peak-to-average power ratio (PAR). In general, an orthogonal transform of the code matrix C for a block of symbols can reduce the PAR but not affect the performance of the space-time code. In particular, the orthogonal transformation could be a simple rotation of π/4 plus reflection for antennas 1-2 and for antennas 3-4:

$$C \to CW \text{ with } W = (1/\sqrt{2}) \begin{bmatrix} 1 & 1 & 0 & 0 \\ 1 & -1 & 0 & 0 \\ 0 & 0 & 1 & 1 \\ 0 & 0 & 1 & -1 \end{bmatrix}$$

Note that without W applied, the first antenna would successively transmit $x_1, 0, x_3, 0$, and the second antenna would successively transmit $0, x_2, 0, x_4$; whereas, with W applied the first antenna would successively transmit $x_1/\sqrt{2}, x_1/\sqrt{2}, x_3/\sqrt{2}, x_3/\sqrt{2}$, and the second antenna would successively transmit $x_2/\sqrt{2}, -x_2/\sqrt{2}, x_4/\sqrt{2}, -x_4/\sqrt{2}$. Thus a large PAR due to transmitting 0s would be reduced. The orthogonal matrix W can be written as $$W = \begin{bmatrix} U & 0 \\ 0 & U \end{bmatrix}$$

where U is a 2×2 orthogonal matrix as in section 2, and thus this transformation preserves the 3-level orthogonality. Also, the reflection could be omitted to have a pure rotation which just reverses signs on antennas 2 and 4:

$$U = (1/\sqrt{2}) \begin{bmatrix} 1 & 1 \\ -1 & 1 \end{bmatrix}.$$

The forgoing orthogonal transformation also applies in the P×P case to reduce PAR.

6. Receiver

FIG. 3 illustrates a first preferred embodiment receiver with Q antennas In particular, each antenna connects to a down-converter which drives a RAKE detector having one or more tracking fingers (including for CDMA systems a sub-chip-rate sampler for A/D conversion, early-late chip synchronizer with despreading correlator or for multitone systems a DFT), path channel estimation to track resolvable received multipath signals, and maximal ratio combiner to combine the multipath detected signals using SNR weights. For the qth antenna, the received signal over four symbol periods corresponding to the block of four transmitted symbols $s_1, s_2, s_3, s_4$ is $r_q = H_q s + \text{noise}_q$ where as in section 2, $r_q=[r_{q,1}, r_{q,2}, r_{q,3}^*, r_{q,4}^*]^T$, $s=[s_1, s_2, s_3^*, s_4^*]^T$, and $H_q$ is the 4×4 channel-code matrix from the transmitter to the qth receive antenna. Detection with maximal ratio combining of multipaths for each antenna uses the detection statistic $y_q = H_q^H r_q = H_q^H H_q s + H_q^H \text{noise}_q$ where $y_q=[y_{q,1}, y_{q,2}, y_{q,3}, y_{q,4}]^T$.

Next, combine the results of the Q antenna detectors: $y=\Sigma_{1\leq q \leq Q} y_q$; and write $y=[y_1, y_2, y_3, y_4]^T$. Then split the four components of y into a pair of 2-vectors: $y=[y_a\ y_b]^T$ where $y_a=[y_1, y_2]^T$ and $y_b=[y_3, y_4]^T$. This split uses the 3-level orthogonality in that each $H_q^H H_q$ has the section 2 form of vanishing upper right 2×2 and lower left 2×2 submatrices so $y_a$ depends upon $s_\alpha$ and $y_b$ depends upon $s_\beta$. Then for each 2-vector use a 2×2 detector as illustrated in FIG. 3. The detectors could be maximum likelihood detectors, linear detectors such as linear zero-forcing, iterative zero-forcing, linear MMSE, or iterative MMSE. The operation of each detector is described in the following paragraphs.

Also, $y_a$ and $y_b$ can be be written as follows $$y_a = R\, s_a + n_a, \quad y_b = R\, s_b + n_b$$

where the noise $n_a$ and $n_b$ are zero-mean, independent, and identical complex Gaussian 2-vectors with covariance matrix $\sigma^2 R$. The maximum likelihood (ML) detector for the transmitted symbols $s_1, s_2, s_3, s_4$ is $$\hat{s}_a = \arg\min_{s \in S_1 \times S_2} (y_a - Rs)^H R^{-1}(y_a - Rs)$$

$$\hat{s}_b = \arg\min_{s \in S_3^* \times S_4^*} (y_b - Rs)^H R^{-1}(y_b - Rs)$$

$$\hat{s}_1 = [\hat{s}_a]_1,\ \hat{s}_2 = [\hat{s}_a]_2,\ \hat{s}_3 = [\hat{s}_b]_1^*,\ \hat{s}_4 = [\hat{s}_b]_2^*$$

where $[x]_p$ denotes the p-th element of vector x. Here, $S_p$ is the signal constellation (set) corresponding to the symbol $s_p$ and $\hat{s}_p$ indicates the hard-decision estimate of $s_p$.

The linear detectors (linear ZF and linear MMSE) can be written as:

$$z_a = F_a y_a,\quad z_b = F_b y_b$$

$$\hat{s}_1 = D\{[z_a]_1\},\ \hat{s}_2 = D\{[z_a]_2\},\ \hat{s}_3 D\{[z_b]_1\}^*,\ \hat{s}_4 = D\{[z_b]_2\}^*$$

For LZF: $F_a = F_b = R^{-1}$

For LMMSE: $F_a = (R + \sigma^2 \Lambda_a^{-1})^{-1}$, $F_b = (R + \sigma^2 \Lambda_b^{-1})^{-1}$ $$\Lambda_a = E[s_a s_a^H],\ \Lambda_b = E[s_b s_b^H]$$

where $D\{.\}$ is a single-input single-output maximum likelihood symbol decision device which generates a hard-decision symbol estimate.

A 2×2 iterative detector (iterative ZF or MMSE) with detection ordering is composed of two linear detection stages with decision feedback interference cancellation in between. Detection ordering is used to reduce the effect of decision feedback error. The idea is to first detect the most reliable symbol, and then subtract its contribution from the received signal. Let $[M]_{i,j}$ denote the (i,j)-th element of matrix M and $[M]_{i,:}$ denote the i-th row of matrix M. The complete iterative MMSE detector with (MSE-based) detection ordering can be described as follows:

$$e_1 = \left[(R + \sigma^2 \Lambda_a^{-1})^{-1}\right]_{1,1},\ e_2 = \left[(R + \sigma^2 \Lambda_a^{-1})^{-1}\right]_{2,2}$$

if $e_1 \le e_2$:

$$z_1 = \left[(R + \sigma^2 \Lambda_a^{-1})^{-1}\right]_1,\!: y_a \to \hat{s}_1 = D\{z_1\}$$

$$z_2 = \frac{[y_a]_2 - [R]_{2,1}\hat{s}_1}{[R]_{2,2} + \sigma^2 [\Lambda_a]_{2,2}^{-1}} \to \hat{s}_2 = D\{z_2\}$$

else $$z_2 = \left[(R + \sigma^2 \Lambda_a^{-1})^{-1}\right]_2,\!: y_a \to \hat{s}_2 = D\{z_2\}$$

$$z_1 = \frac{[y_a]_1 - [R]_{1,2}\hat{s}_2}{[R]_{1,1} + \sigma^2 [\Lambda_a]_{1,1}^{-1}} \to \hat{s}_1 = D\{z_1\}$$

end

-continued $$e_3 = \left[(R + \sigma^2 \Lambda_b^{-1})^{-1}\right]_{1,1},\ e_4 = \left[(R + \sigma^2 \Lambda_b^{-1})^{-1}\right]_{2,2}$$

if $e_3 \le e_4$:

$$z_3 = \left[(R + \sigma^2 \Lambda_b^{-1})^{-1}\right]_1,\!: y_b \to \hat{s}_3 = D\{z_3\}^*$$

$$z_4 = \frac{[y_b]_2 - [R]_{2,1}\hat{s}_3^*}{[R]_{2,2} + \sigma^2 [\Lambda_b]_{2,2}^{-1}} \to \hat{s}_4 = D\{z_4\}^*$$

else $$z_4 = \left[(R + \sigma^2 \Lambda_b^{-1})^{-1}\right]_2,\!: y_b \to \hat{s}_4 = D\{z_4\}^*$$

$$z_{31} = \frac{[y_b]_1 - [R]_{1,2}\hat{s}_4^*}{[R]_{1,1} + \sigma^2 [\Lambda_b]_{1,1}^{-1}} \to \hat{s}_3 = D\{z_3\}^*$$

end

The complete iterative ZF detector with (MSE-based) detection ordering can be described as follows:

$$e_1 = [R^{-1}]_{1,1},\ e_2 = [R^{-1}]_{2,2}$$

if $e_1 \le e_2$:

$$z_1 = [R^{-1}]_1,\!. y_a \to \hat{s}_1 = D\{z_1\}$$

$$z_2 = \frac{[y_a]_2 - [R]_{2,1}\hat{s}_1}{[R]_{2,2}} \to \hat{s}_2 = D\{z_2\}$$

$$z_3 = [R^{-1}]_1,\ y_b \to \hat{s}_3 = D\{z_3\}^*$$

$$z_4 = \frac{[y_b]_2 - [R]_{2,1}\hat{s}_3^*}{[R]_{2,2}} \to \hat{s}_4 = D\{z_4\}^*$$

else $$z_2 = [R^{-1}]_2,\ y_a \to \hat{s}_2 = D\{z_2\}$$

$$z_1 = \frac{[y_a]_1 - [R]_{1,2}\hat{s}_2}{[R]_{1,1}} \to \hat{s}_1 = D\{z_1\}$$

$$z_4 = [R^{-1}]_2,\ y_b \to \hat{s}_4 = D\{z_4\}^*$$

$$z_3 = \frac{[y_b]_1 - [R]_{1,2}\hat{s}_4^*}{[R]_{1,1}} \to \hat{s}_3 = D\{z_3\}^*$$

end

8. Simulation Results

Figure 4:
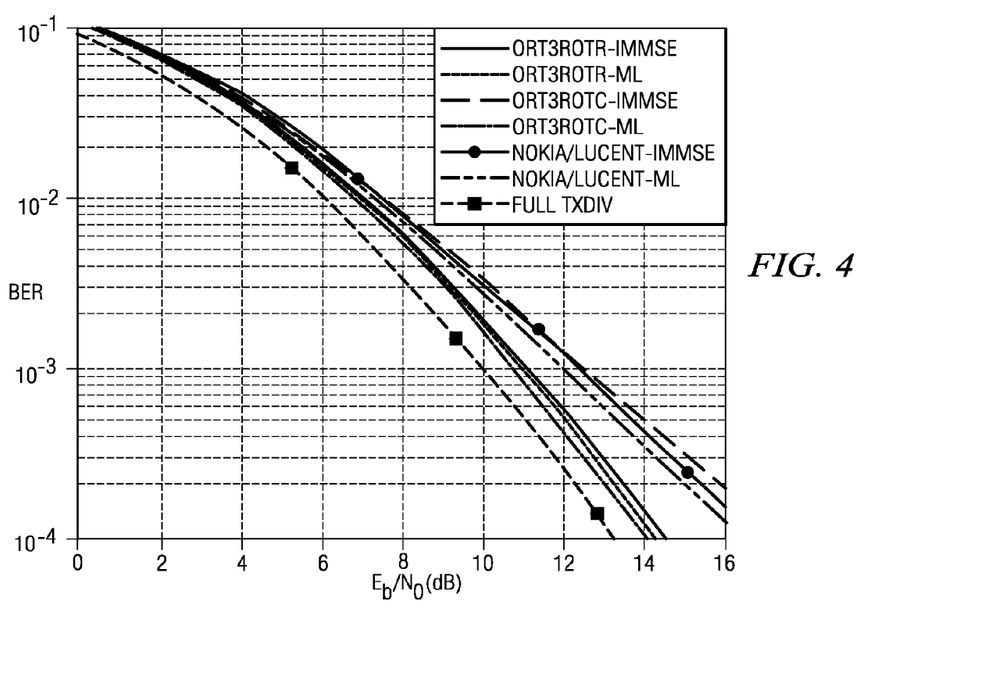
FIGS. 4-5 present simulation results.
Figure 5:
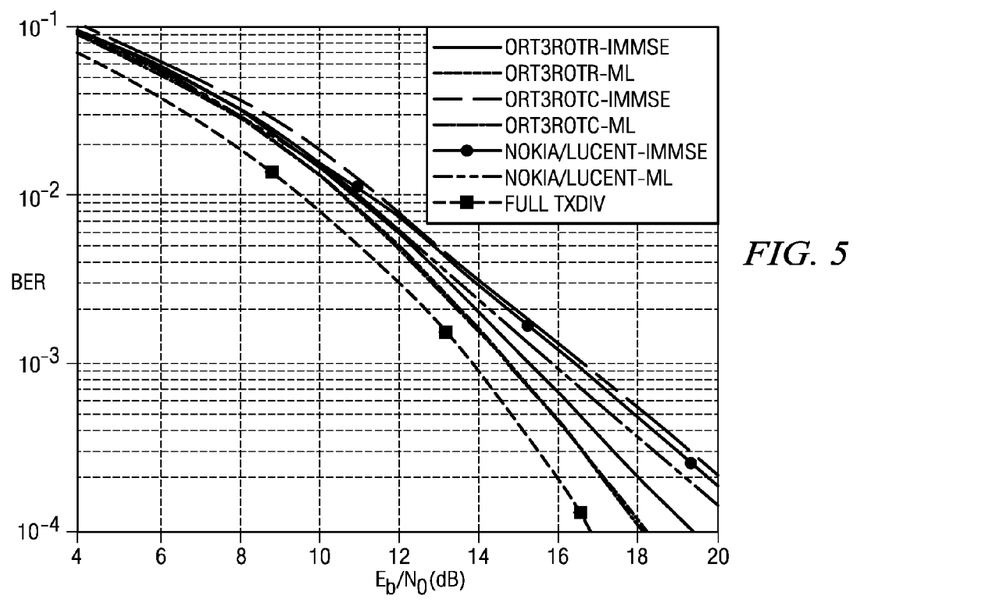

FIGS. 4 and 5 show simulation results for the case of Q=1 receive antenna with QPSK and 16QAM modulation. Two code designs in Table 1 (real and complex rotation) that are optimized for QPSK are used.

9. Modifications

The preferred embodiments can be modified in various ways while retaining one or more of the features of block STTD code matrices, partial (3-level) orthogonality, and diversity gain and coding gain optimization.

For example, the block size in the STTD could be larger than 2×2 with the orthogonality corresponding to the block size.

What is claimed is:

1. A method of space-time block encoding for communication with a remote wireless device, comprising;
   (a) for an integer N greater than 1, defining 2N×2N code matrices of the form $$C(s) = \begin{bmatrix} C_\alpha & C_\beta \\ -C_\beta^* & C_\alpha^* \end{bmatrix}$$

with N×N submatrices:

$$C_\alpha = \Sigma_{1 \le m \le N} s_m A_m + s_m^* B_m$$

$$C_\beta = \Sigma_{N+1 \le m \le 2N} s_m A_m + s_m^* B_m$$

where each of $A_m$ and $B_m$ is a N×N complex matrix and $s_1, s_2, \ldots, s_{2N-1}, s_{2N}$ is a block of symbols.

2. The method of claim 1, wherein:
   (a) N=2.
3. The method of claim 2, wherein:
   (a) said $B_1=B_2=B_3=B_4=0$; and
   (b) $\det[a_{j1}\ a_{k1}]+\det[a_{j2}\ a_{k2}]=0$ for j in the set {1,2} and k in the set {3,4} where $a_{j1}$ is the first column of $A_j$, $a_{k1}$ is the first column of $A_k$, $a_{j2}$ is the second column of $A_j$, and $a_{k2}$ is the second column of $A_k$.
4. The method of claim 3, wherein:
   (a) said defining of step (a) of claim 1 includes searching over possible $A_1, A_2, A_3, A_4$, with a diversity gain of 4 to maximize coding gain.
5. The method of claim 3, wherein:
   (a) said defining of step (a) of claim 1 includes (i) searching over possible $A_1, A_2, A_3, A_4$, with a diversity gain of 4 and a maximum coding gain; and then (ii) searching over possible $A_1, A_2, A_3, A_4$, with a diversity gain of 4 and a coding gain exceeding a threshold determined as a fraction of said maximum coding gain from substep (i) to minimize code multiplicity.
6. The method of claim 3, wherein:
   (a) $A_3=A_1^*$ and $A_4=A_2^*$; and
   (b) $A_1, A_2$, are selected from the group consisting of pairs of 2×2 diagonal matrices and right multiplications of such pairs by a 2×2 orthogonal matrix, wherein $A_1$ is not a multiple of $A_2$.
7. The method of claim 3, wherein:
   (a) $A_3=A_1^*$ and $A_4=A_2^*$; and
   (b) $A_1, A_2$, are selected from the group consisting of pairs of 2×2 diagonal matrices $$\begin{bmatrix} \theta_{11} & 0 \\ 0 & \theta_{21} \end{bmatrix}, \begin{bmatrix} \theta_{12} & 0 \\ 0 & \theta_{22} \end{bmatrix},$$

where the matrix $$\Theta = \begin{bmatrix} \theta_{11} & \theta_{12} \\ \theta_{21} & \theta_{22} \end{bmatrix}$$

is a unitary matrix, and right multiplications of such pairs by a 2×2 orthogonal matrix.

8. A method of transmission to a remote receiver, comprising;
   (a) space-time block encoding a symbol stream; and
   (b) transmitting the results from step (a) from a plurality of antennas;
   (c) wherein said space-time block code has 4×4 code matrices of the form $$C(s) = \begin{bmatrix} C_\alpha & C_\beta \\ -C_\beta^* & C_\alpha^* \end{bmatrix}$$

with 2×2 submatrices:

$$C_\alpha = s_1 A_1 + s_2 A_2 + s_1^* B_1 + s_2^* B_2$$

$$C_\beta = s_3 A_3 + s_4 A_4 + s_3^* B_3 + s_4^* B_4$$

where each of $A_k$ and $B_k$ is a 2×2 complex matrix and $s_1, s_2, s_3, s_4$ is a block of symbols of said symbol stream.

9. The method of claim 8, wherein:
   (a) said $B_1=B_2=B_3=B_4=0$; and
   (b) $\det[a_{j1}\ a_{k1}]+\det[a_{j2}\ a_{k2}]=0$ for j in the set {1,2} and k in the set {3,4} where $a_{j1}$ is the first column of $A_j$, $a_{k1}$ is the first column of $A_k$, $a_{j2}$ is the second column of $A_j$, and $a_{k2}$ is the second column of $A_k$.
10. The method of claim 8, wherein:
    (a) said transmitting of step (b) of claim 8 is TDMA.
11. The method of claim 8, wherein:
    (a) said transmitting of step (b) of claim 8 is CDMA.
12. The method of claim 8, wherein:
    (a) said transmitting of step (b) of claim 8 is OFDM.
13. A method of reception from a remote transmitter, comprising;
    (a) receiving signals of space-time block encoded symbol stream from a plurality of antennas; and
    (b) detecting said received signals including partitioning blocks of four received symbols for detection in two parallel 2×2 detectors;
    (c) wherein said space-time block code has 4×4 code matrices of the form $$C(s) = \begin{bmatrix} C_\alpha & C_\beta \\ -C_\beta^* & C_\alpha^* \end{bmatrix}$$

with 2×2 submatrices:

$$C_\alpha = s_1 A_1 + s_2 A_2 + s_1^* B_1 + s_2^* B_2$$

$$C_\beta = s_3 A_3 + s_4 A_4 + s_3^* B_3 + s_4^* B_4$$

where each of $A_k$ and $B_k$ is a 2×2 complex matrix and $s_1, s_2, s_3, s_4$ is a block of symbols of said symbol stream.

14. The method of claim 13, wherein:
    (a) said $B_1=B_2=B_3=B_4=0$; and
    (b) $\det[a_{j1}\ a_{k1}]+\det[a_{j2}\ a_{k2}]=0$ for j in the set {1,2} and k in the set {3,4} where $a_{j1}$ is the first column of $A_j$, $a_{k1}$ is the first column of $A_k$, $a_{j2}$ is the second column of $A_j$, and $a_{k2}$ is the second column of $A_k$.
15. The method of claim 13, wherein:
    (a) said receiving of step (a) of claim 13 is TDMA.
16. The method of claim 13, wherein:
    (a) said receiving of step (a) of claim 13 is CDMA.
17. The method of claim 13, wherein:
    (a) said receiving of step (a) of claim 13 is OFDM.

* * * * *